United States Patent Office 3,451,700
Patented June 24, 1969

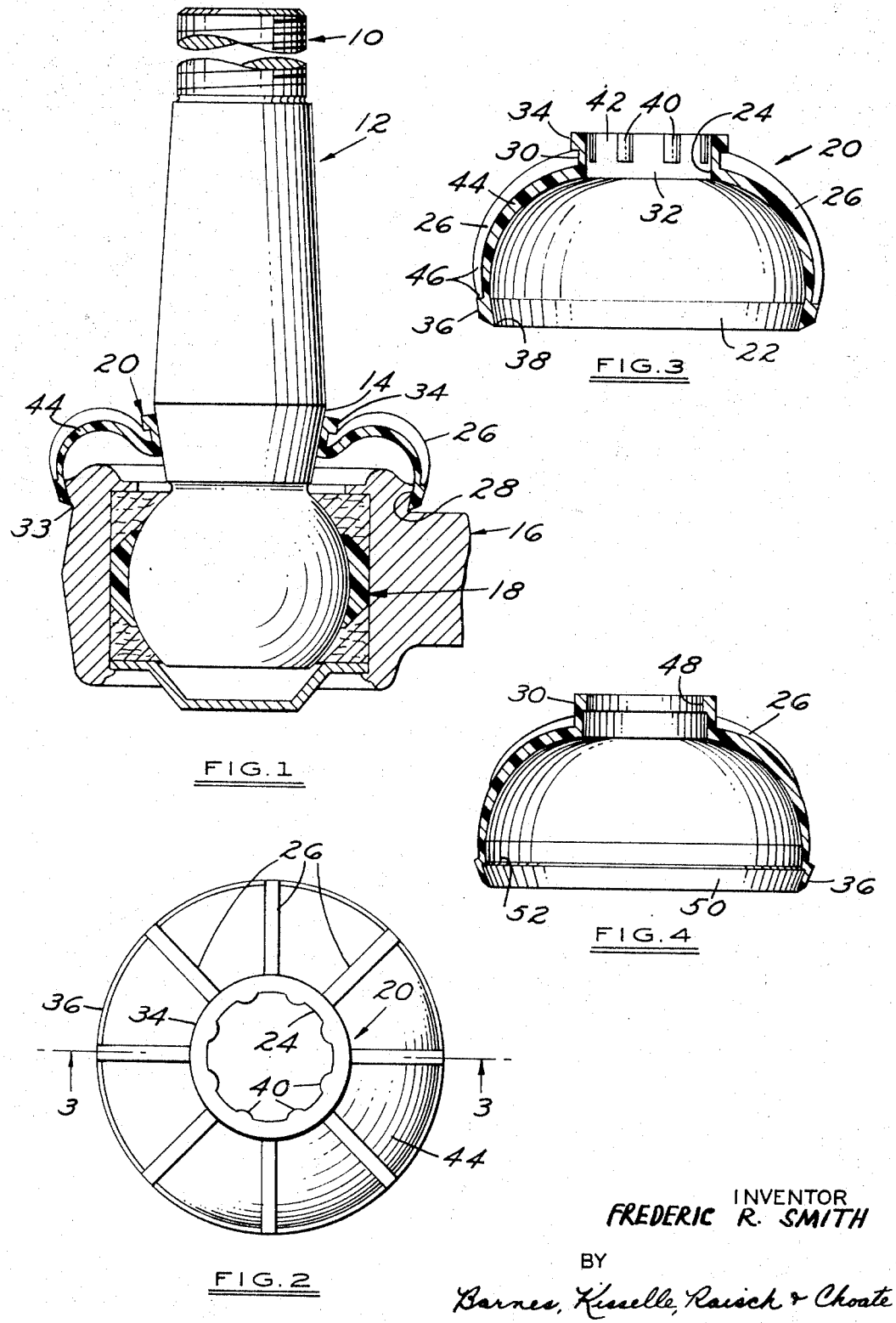

---

3,451,700
DUST SEAL FOR BALL JOINTS
Frederic R. Smith, Whitmore Lake, Mich., assignor to
O & S Bearing & Mfg. Co., Whitmore Lake, Mich.,
a corporation of Delaware
Filed Feb. 13, 1968, Ser. No. 705,135
Int. Cl. F16c *11/06;* F16b *7/00;* B25g *3/38*
U.S. Cl. 287—90                              10 Claims

---

ABSTRACT OF THE DISCLOSURE

This application discloses improvements in dust seals for ball joint assemblies of a type commonly used in motor vehicle steering linkages. Due to the resiliency and ribbed design of the dust seal, its clamping or sealing surfaces are self-biasing and are relieved or ported to prevent internal pressures from impairing the effectiveness of the seal.

---

Background of the invention

This invention relates to improvements in dust seals for ball joint assemblies of a type commonly used in vehicle front suspension steering linkages. This invention is an improved version of a dust seal itself, not of the ball joint assembly which is old in the art.

The ball joint dust seals that are illustrated in the prior art by the Kogstrom U.S. Patent No. 2,921,809 and the references cited therein are seals that require some external means of biasing one or more of their sealing surfaces into contact with mating surfaces on the ball joint assembly. In the applicant's device the sealing surfaces are urged into contact with mating surfaces on the ball joint assembly by the resiliency of the material from which the dust seal is formed and by a plurality of peripherally spaced integral ribs.

The applicant's device discloses a means of porting or venting the dust seal so that a differential in the air pressure between the inner and outer surfaces of the dust seal will not develop. If a differential pressure does develop, it can either collapse the dust seal or force it away from its mating sealing surfaces on the ball joint assembly. Either of these conditions would impair the effectiveness of the dust seal. This movement of the seal due to changes in atmospheric pressure also creates a pumping action which tends to induce dirt and other contaminants into the ball joint cavity.

In addition the applicant's device discloses an improved means of sealing or shielding the ball joint assembly from contaminants which is far simpler and less expensive to manufacture and assemble to the ball joint than the prior devices.

Description of the invention

This invention relates to improvements in dust seals for ball joint assemblies of the type commonly used in motor vehicle steering systems.

A principal object of this invention is to provide a dust seal which biases itself against the sealing surfaces of the ball joint member, thereby eliminating the use of an external clamping means to secure the dust seal to the ball joint assembly.

Another object of this invention is to provide an embodiment of a dust seal that is easily and simply manufactured and assembled to a ball joint.

Another object of this invention is to provide a dust seal for a ball joint in which the effectiveness of the seal is not impaired by a differential in the air pressure on its inner and outer surfaces.

Another object of this invention is to provide a seal that allows the ball stud to be moved relative to the ball joint main body without impairing the effectiveness of the seal.

Other objects and features of this invention will be apparent from the following description and claims in which there is found the manner of making and using the invention and the best mode contemplated by the inventor for carrying out the invention.

Drawings accompany this disclosure and the various views thereof may be briefly described as:

FIGURE 1, a side elevational view partially in section showing the dust seal assembled to a ball joint.

FIGURE 2, a plan view of the dust seal.

FIGURE 3, a sectional view on the line 3—3 of FIGURE 2.

FIGURE 4, a sectional side elevational view of a second dust seal structure.

Referring to the drawings:

In FIGURE 1, a ball joint 10 of standard construction comprises a ball stud member 12 with a tapered surface 14 and a body member 16 attached to the ball stud member 12 by a suitable retainer assembly designated generally as 18. The dust seal 20 is shown assembled to the ball joint 10 and is formed or rubber, preferably oil resistant; Polyurethane, Texin 480A; or a similar flexible oil and weather resistant material with a low coefficient of friction, low set, high resistance to abrasion and good flexure strength.

The dust seal 20 as perhaps best shown in FIGURES 2 and 3 is in the general configuration of an inverted cup or a hemisphere with a substantially equatorial opening having a sealing surface 22 and a smaller stud opening 24 in polar relationship thereto. The dust seal 20 contains integral ribs 26 peripherally spaced on lines of longitude relative to the polar opening on the outer surface in such a manner that they bias an internal sealing surface 22 radially inward. This design feature eliminates the need to clamp externally or otherwise bias the sealing surface 22 toward its mating surface 28 on the body member 16.

The cylindrical opening 24 in the neck portion 30 at the top of the dust seal 20 is slightly smaller than the minor diameter of the tapered surface 14 of the ball stud member 12 so that when the dust seal 20 is properly positioned on the tapered surface 14 the dust seal surface 32 will be biased radially inward due to the resiliency of the material of which it is formed. However, this fit between the tapered surface 14 and the dust seal surface 32 is not so snug or tight that the dust seal 20 will turn or twist when the ball stud member 12 is rotated. An external flange 34 at the top of the neck portion 30 serves to strengthen the neck portion and prevent it from gaping. Also an annular thickened rim portion 36 at the opening 22 tapers to a knife edge 38 to contact and seal against the annular wall of ball joint housing 16.

Axially extending short ribs or protrusions 40 on inner surface 32 extending downwardly for a portion of neck opening 24 provide small relieved or porting areas 42 between surface 32 of dust seal 20 and mating tapered surface 14 of ball stud member 12, so that the air pressure on the inner and outer surfaces of dust seal 20 will be equalized as the seal is worked by movement of the joint.

This pressure differential is created in part by changes in the atmospheric pressure, by flexing of the seal due to rapid movement of the ball joint under service conditions, and also by temperature changes of the air entrapped within the dust seal caused by the heat generated by the friction between the moving components of the ball joint assembly. Relief areas 42 prevent the development of a pressure differential between inner and outer surfaces of dust seal 20 which would either collapse dust seal 20 or would "pop" or force sealing surfaces 22, 32 away from their mating surfaces 28, 14, thereby impairing the effectiveness of the dust seal assembly. Rapid pressure changes would also create a pumping action that would pull dirt under the edges of seals 22, 24. Relieved areas 42 also reduce the total frictional force between tapered surface 14 and seal surface 32 that is created when ball stud member 12 rotates relative to dust seal 20. This decreases the tendency of the dust seal to twist or turn when ball stud member 12 is rotated.

The material from which dust seal 20 is formed should be sufficiently flexible to allow ball stud member 12 to be pivotally moved relative to body member 16 without impairing the effectiveness of the seal between surface pairs 14, 32, and 28, 22. Perhaps as best shown in FIGURE 3, the wall 44 of the dust seal 20 is narrowed in the area 46 adjacent to the rim portion 36 so that when the ball stud member 12 is pivotally moved relative to the body member 16 the dust seal 20 will flex in the area 46. This allows the sealing surfaces 22, 32 of the dust seal 20 to remain in contact with their mating surfaces 28, 14 when the ball stud member 12 moves relative to the body member 16.

In FIGURE 4 another dust seal structure in which the neck portion 30 has an internal flange 48, the ribs 26 extend only slightly more than half way between the neck 30 and the rim portion 36, and having a double seal lower lip with two sealing surfaces 50, 52 is shown. In this structure the flange 48 prevents the neck portion 30 from gaping and it is located inside of the neck to simplify the design of the mold used to form the dust seal. This structure illustrates the use of ribs 26 which do not extend all the way from the neck to the rim 36. The length and the width of the ribs are varied to change and control the magnitude of the sealing force on the sealing surfaces 50, 52 in the dust seal of FIGURE 4 and the sealing surface 22 in the dust seal of FIGURE 3. In FIGURE 4 the radial displacement between the sealing surfaces 50, 52 is greatly exaggerated and is normally in the range of 10 to 30 thousandths of an inch depending on the particular application. The double seal lip is usually used in situations where the mating surfaces of the body member are comparatively rough or contain depressions or have abrupt changes in contour. As shown in FIGURE 4, in certain situations it is not necessary to use protrusions on the inner surface of the neck portion to provide adequate porting to eliminate a differential pressure buildup which adversely effect the sealing properties of the structure. When such a structure is used, it is important to select a material for forming the dust seal which has a low coefficient of friction so that the dust seal will not be distorted or wound up when the ball stud member 12 is rotated relative to the seal.

In its operational environment the dust seal is positioned on the ball joint so that its sealing surfaces are biased toward their mating surfaces on the ball stud member and the body member by the resiliency of the material forming the dust seal and by the periphery spaced ribs on its outer surface, thereby effectively sealing and protecting the ball joint from contamination by moisture, water, sludge and other contaminants. It will be noticed that the neck portion 30 of FIGURE 1 is positioned on the downwardly decreasing diameter of the stud 12 so that it will create a downward pressure on the walls of the seal. The lower portion of the inner diameter of the neck portion will seal on the stud to prevent entrance of contaminants, but the upper portion will relieve abnormal pressure differentials as the seal is worked without admitting dirt and dust.

What is claimed as new is as follows:

1. A device for sealing a ball joint assembly at the stud end which comprises:
   (a) a substantially hollow hemispherical sealing member formed of a flexible resilient material having a large opening substantially at an equatorial position on the hemispherical member to engage one end of a ball joint body member, and a smaller stud opening at a polar location relative to the equatorial opening, and
   (b) a plurality of solid, spaced reinforcing pressure transmitting ribs extending radially from the outer peripheral surface and integral with the flexible, resilient material and extending longitudinally between the openings wherein downward pressure on the sealing member at the smaller opening is transmitted to the edge of the larger opening to hold the edges in sealing engagement with the ball joint body member.

2. A device as defined in claim 1 in which a neck portion extending outwardly from the smaller opening has an annular external flange at its outer end and a plurality of short axial protrusions circumferentially spaced and extending inwardly for a portion of the internal surface of the neck portion.

3. A device as defined in claim 1 in which a neck portion extending outwardly from the smaller opening has a plurality of short axial protrusions circumferentially spaced and extending inwardly for a portion of the internal surface of the neck portion.

4. A device as defined in claim 1 in which the wall of the substantially hollow hemispherical sealing member is narrowed in an area adjacent to the large opening at the equatorial position.

5. A device as defined in claim 1 in which the ribs extend more than half-way from the stud opening toward the equatorial opening.

6. A device as defined in claim 1 in which the ribs extend substantially from the stud opening to the equatorial opening.

7. A device as defined in claim 1 in which the edge of the larger opening has two internal surfaces which are axially and slightly radially displaced relative to each other, whereby the surfaces provide a double seal lip.

8. A device for sealing a ball joint assembly at the stud end which comprises:
   (a) a substantially hollow hemispherical sealing member formed of a flexible resilient material having a large opening substantially at an equatorial position on the hemispherical member, an integral annular rim portion surrounding the large opening with the rim portion being tapered to a sharp edge to contact a ball joint body member, and a smaller stud opening through an outwardly extending neck portion at a polar location relative to the equatorial opening, the neck opening having an annular external flange at its outer end and a plurality of short axial protrusions circumferentially spaced and extending inwardly for a portion of the internal surface of the neck portion, and
   (b) integral reinforcing pressure transmitting ribs longitudinally positioned between and coacting with the annular external flange and the annular rim portion wherein downward pressure on the sealing member at the smaller opening is transmitted to the tapered edges of the larger opening to hold the edges in sealing engagement with the ball joint body member.

9. A device as defined in claim 8 in which the wall of the substantially hollow hemispherical sealing member is narrowed in an area adjacent to the large opening at the equatorial position.

10. In a sealed ball joint assembly which comprises:
    (a) a stud member having a ball head and a tapered sealing surface tending to converge toward the ball end of the stud member, (b) a body member having a retainer cavity and a sealing surface, and (c) a retainer which captivates the ball head in the retainer cavity that improvement which comprises:

a substantially hollow hemispherical sealing member formed of a flexible resilient material having a large opening substantially at an equatorial position on the hemispherical member which engages the sealing surface of the body member, a small stud opening at a polar location relative to the equatorial opening which engages the tapered sealing surface of the stud member, and a plurality of solid, spaced reinforcing pressure transmitting ribs extending longitudinally between said openings and radially from the outer peripheral surface and integral with the flexible, resilient material between the openings which transmit the force created on the sealing member by its proper positioning on the tapered surface of the ball stud to the edge of the larger opening to hold the edge in sealing engagement with the ball joint body member.

References Cited

UNITED STATES PATENTS

| | | |
|---|---|---|
| 2,559,857 | 7/1951 | Edwards. |
| 2,928,687 | 3/1960 | Latzen. |
| 3,166,333 | 1/1965 | Henley. |
| 3,279,832 | 10/1966 | Bergman ———————— 287—87 |

FOREIGN PATENTS

| | | |
|---|---|---|
| 602,537 | 3/1960 | Italy. |
| 916,875 | 1/1963 | Great Britain. |
| 1,374,700 | 8/1964 | France. |
| 1,050,169 | 12/1966 | Great Britain. |

CARL W. TOMLIN, *Primary Examiner.*

ANDREW V. KUNDRAT, *Assistant Examiner.*

U.S. Cl. X.R.

277—212

Disclaimer

3,451,700.—*Frederic R. Smith*, Whitmore Lake, Mich. DUST SEAL FOR BALL JOINTS. Patent dated June 24, 1969. Disclaimer filed Dec. 11, 1972, by the assignee, *Gulf & Western Industrial Products Company*.
Hereby enters this disclaimer to claim 7 of said patent.
[*Official Gazette March 12, 1974.*]